April 29, 1941. P. E. HODGDON ET AL 2,240,072
TRANSLUCENT LAMINATED ARTICLE
Filed May 3, 1939 2 Sheets-Sheet 1

INVENTORS,
Paul E. Hodgdon,
Edward C. LaBelle,
BY
Blake A Leaver, ATTORNEY.

April 29, 1941.　　P. E. HODGDON ET AL　　2,240,072
TRANSLUCENT LAMINATED ARTICLE
Filed May 3, 1939　　2 Sheets-Sheet 2
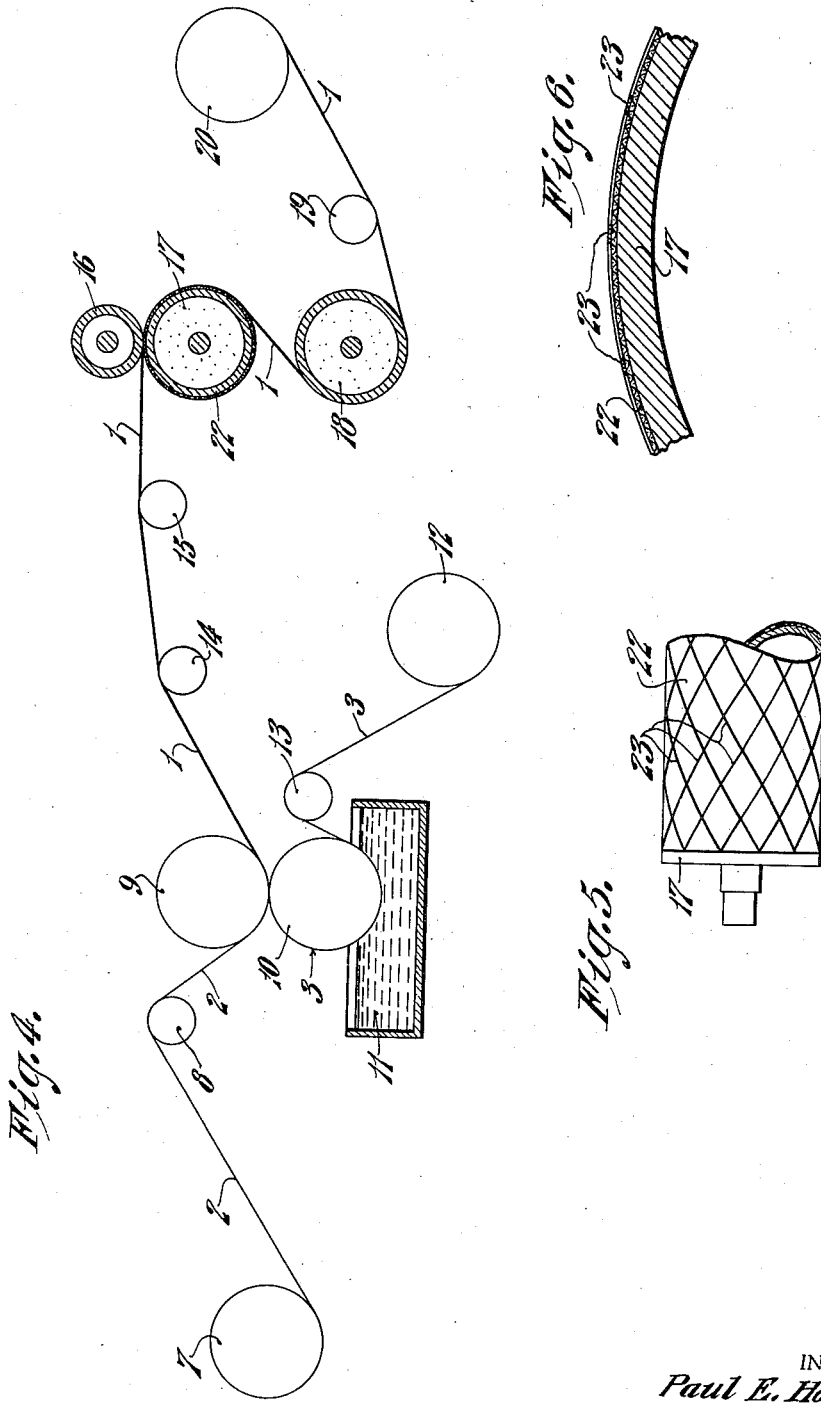
INVENTORS,
Paul E. Hodgdon,
Edward C. LaBelle,
BY Blake＿＿＿, ATTORNEY.

Patented Apr. 29, 1941

2,240,072

UNITED STATES PATENT OFFICE 2,240,072

TRANSLUCENT LAMINATED ARTICLE

Paul E. Hodgdon, Heartwellville, Readsboro, Vt., and Edward C. La Belle, Monroe Bridge, Mass.

Application May 3, 1939, Serial No. 271,454

2 Claims. (Cl. 154—50)

This invention relates to improvements in laminated paper and the manufacture of the same.

An object of the invention is to provide a laminated paper or sheet material having incorporated therein a design or designs, or a distinctive marking, having the nature of a transparency.

In the manufacture of laminated paper, in which two or more webs or sheets of transparent paper are bonded with a suitable adhesive, it is well known in the art that the adhesive between the webs decreases the transparency of the finished product. Applicants have made use of this fact in producing the invention herein disclosed, which comprises a laminated paper in which the layer of adhesive between the layers of paper has been deliberately varied in thickness to produce areas or lines of relative transparency, as compared to the normal translucency of the laminated paper as a whole. The result of this process is the production of a laminated sheet in which predeterminated designs, letters, or figures, become clearly visible when held to a light, because of the contrast between the transparency of the design and the translucency of the "field" or laminated sheet proper.

The process herein disclosed is applicable to all types of laminated paper which prmits the passage of light, even to a slight degree. A preferred form of the invention comprises two sheets of hydrated sulphite paper, such as glassine, bonded together with a hot wax adhesive, such as a clear wax, a mixture of wax and resin, or a mixture of wax, resin, and oil, wherein the laminated sheet has been subjected to unequal pressure while the adhesive was still in a plastic condition, resulting in predetermined areas in which the layer of adhesive between the sheets is relatively thinner than the normal layer of adhesive.

Figure 1:
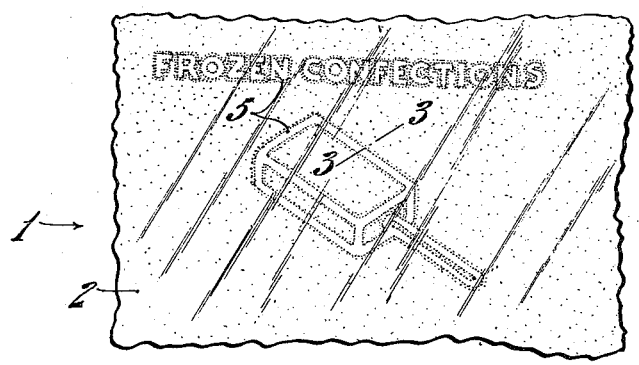
Figure 3:
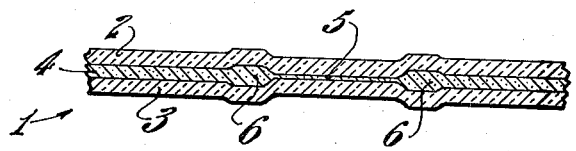
Figure 2:
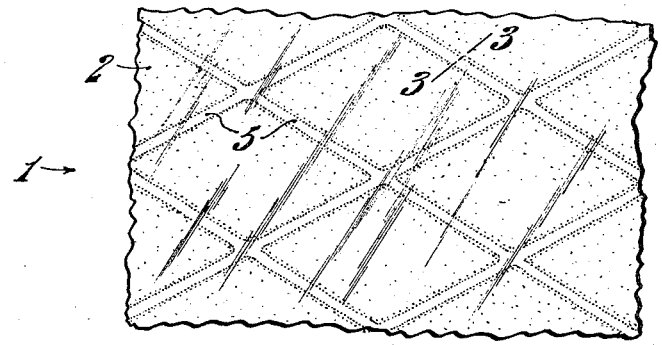

Typical examples of the invention herein disclosed are illustrated in Figs. 1, 2, and 3, of the accompanying drawings, and an apparatus by means of which the process may be performed is illustrated in Figs. 4, 5, and 6.

Fig. 1 is an elevational view of a portion of a laminated paper sheet, showing a design, including lettering, incorporated therein, Fig. 2 is a view similar to Fig. 1, illustrating a typical "overall" design, Fig. 3 is a sectional view, greatly enlarged, taken on the line 3—3 of either Fig. 1 or Fig. 2, Fig. 4 is a diagrammatic view of an apparatus for performing the process, Fig. 5 is a partial, elevational view of the cylinder for making the impressions shown in Fig. 2, and Fig. 6 is a partial, cross sectional view, at an enlarged scale, of the cylinder shown in Fig. 5.

Referring now to the drawings in detail, in which like numerals refer to like parts throughout, A laminated paper sheet 1 includes an upper sheet 2 and a lower sheet 3, bonded together by means of a layer 4 of suitable adhesive material. A design 5 is impressed into the paper sheet 1 by subjecting the sheet 1 to pressure while the adhesive layer 4 is still in a plastic state. The adhesive 4 is forced transversely from the areas 5 by pressure, and the adhesive thus forced out of the area 5 gathers in adjacent bordering areas 6. The result of this operation is to produce a condition in which the film or layer of adhesive at 5 is relatively much thinner than the normal layer of adhesive 4, while the areas 6, adjacent the areas 5, are relatively somewhat thicker than the normal layer 4. The adhesive material 4 is not as transparent as the paper webs or layers 2 and 3. Thus, the transparency of the finished sheet 1 will vary according to the thickness of the adhesive layer between the paper layers 2 and 3. As a result of this condition, the areas 5 are more transparent than the main body of the sheet 1, as represented by the adhesive layer 4, and the areas 6 are less transparent or translucent than the main portion 4. The result of this formation is to produce a contrast in transparency or translucency between the areas 5 outlining the design, and the field of the paper sheet, such contrast being accentuated by an increased opacity in areas 6 closely bordering the areas 5.

The degree of contrast between the design and the field of the finished laminated paper is dependent upon the relative transparency of the adhesive used. An example of a satisfactory product comprises two sheets of transparent glassine paper bonded together with an adhesive of hot wax, or hot wax and resin, or hot wax, and oil, with the design impressed into the laminated sheet while the adhesive is still in a plastic condition. This laminated material is fairly transparent as a whole, yet there is sufficient contrast between the design and the field to make the design plainly visible. Greater contrast may be obtained by introducing into the adhesive material substances which render the adhesive less transparent. For example, the addition of from one to three percent of titanium dioxide will result in a laminated paper which is sufficiently transparent for all practical purposes, but in which the design is more clearly discernible than in the laminated sheet in which the wax adhesive alone is used. As the proportion of titanium dioxide is increased above three percent, the finished laminated paper becomes less transparent, approaching translucency, and the design becomes more and more clear, by contrast.

The process by which this laminated material is manufactured comprises coating a web of paper with a suitable adhesive, bonding a second web of paper to the first web by the application of pressure, and carrying the laminated sheet thus formed between pressure rolls while the adhesive is still in a plastic condition, one of the pressure rolls being provided with raised elements corresponding to the design desired. An apparatus for performing this process is illustrated in Figs. 4, 5, and 6 of the drawings.

The web 2 of paper is carried from a supply roll 7 over a tension roll 8 to the nip of pressure rolls 9 and 10. The pressure roll 10 is partially immersed in a bath of adhesive 11. The web 3 of paper is carried from a supply roll 12 over a tensing roll 13 into contact with and around the roll 10, where it is coated with the adhesive 11. The laminated sheet 1 emerges from the nip of the rolls 9 and 10 and passes over a conditioning roll 14 and a tensing roll 15 to pressure rolls 16 and 17, thence around a cooling roll 18, and under a final tensing roll 19 to a takeup roll 20.

The roll 17 is provided with removable and interchangeable sleeves 22, of fabric, wire cloth, rubber, or other suitable material, to which may be attached or secured raised elements 23 comprising the desired design or marking. The elements 23 may be secured on the sleeve 22 by any suitable means, such as cement, solder, wire stitching, or the like.

As the laminated sheet 1 passes between the pressure rolls 16 and 17, while the adhesive is still in a plastic state, the raised elements 23 force a large proportion of adhesive registering therewith to one side, thus producing the result described.

What we claim is:

1. A translucent laminated article bearing a translucent design consisting of two sheets of glassine enclosing a film of wax containing titanium dioxide, said film of wax carrying a design created by impressing the same in selected areas without appreciably altering the surface of the paper, said selected areas being of less thickness than the areas immediately adjacent, whereby said selected areas appear more translucent than the surrounding areas.

2. A translucent laminated article bearing a translucent design consisting of two sheets of glassine enclosing a film of wax, said film of wax carrying a design created by impressing the same in selected areas without appreciably altering the surface of the paper, said selected areas comprising a central portion, said central portion being of less thickness than the areas outside the selected areas whereby the central portion appears more translucent than said outside areas, and a narrower portion bounding said central portion, said narrower portion being of greater thickness than the outside areas whereby the translucency of the central portion of the selected areas is further accentuated.

PAUL E. HODGDON.
EDWARD C. LA BELLE.